US012398344B2

(12) United States Patent
Carus

(10) Patent No.: US 12,398,344 B2
(45) Date of Patent: Aug. 26, 2025

(54) FABRIC CONDITIONER COMPOSITIONS

(71) Applicant: Conopco, Inc., Englewood Cliffs, NJ (US)

(72) Inventor: Mark Anthony Carus, Burton (GB)

(73) Assignee: Conopco, Inc., Englewood Cliffs, NJ (US)

( * ) Notice: Subject to any disclaimer, the term of this patent is extended or adjusted under 35 U.S.C. 154(b) by 898 days.

(21) Appl. No.: 17/311,383

(22) PCT Filed: Dec. 4, 2019

(86) PCT No.: PCT/EP2019/083753

§ 371 (c)(1),
(2) Date: Jun. 7, 2021

(87) PCT Pub. No.: WO2020/120268

PCT Pub. Date: Jun. 18, 2020

(65) Prior Publication Data

US 2022/0025298 A1 Jan. 27, 2022

(30) Foreign Application Priority Data

Dec. 11, 2018 (EP) .................................... 18211728

(51) Int. Cl.

| | |
|---|---|
| ***C11D 3/00*** | (2006.01) |
| ***C11D 3/20*** | (2006.01) |
| ***C11D 3/34*** | (2006.01) |
| ***C11D 3/50*** | (2006.01) |
| ***C11D 11/00*** | (2006.01) |

(52) U.S. Cl.

CPC .......... *C11D 3/0015* (2013.01); *C11D 3/2093* (2013.01); *C11D 3/349* (2013.01); *C11D 3/50* (2013.01); *C11D 2111/12* (2024.01)

(58) Field of Classification Search

CPC ......... C11D 3/0015; C11D 3/349; C11D 3/50; C11D 11/0017

See application file for complete search history.

(56) References Cited

U.S. PATENT DOCUMENTS

| | | | | |
|---|---|---|---|---|
| 4,127,694 | A * | 11/1978 | Murphy | D06M 13/224 442/112 |
| 4,209,549 | A * | 6/1980 | Murphy | C11D 17/047 427/242 |
| 4,883,604 | A * | 11/1989 | Veitenhansl | D06M 15/53 252/8.81 |
| 6,608,024 | B1 * | 8/2003 | DuVal | C11D 1/645 510/522 |
| 8,461,097 | B2 | 6/2013 | Demeyere | |
| 8,563,499 | B2 | 10/2013 | Kohle et al. | |
| 8,680,039 | B2 * | 3/2014 | Lee | C07C 303/24 510/504 |
| 2010/0075890 | A1 * | 3/2010 | Ford | C11D 3/18 510/527 |
| 2011/0269663 | A1 * | 11/2011 | Clowes | C11D 3/3773 510/515 |
| 2014/0106002 | A1 * | 4/2014 | Jensen | A61K 36/328 424/722 |
| 2014/0194336 | A1 * | 7/2014 | Develter | C07H 15/04 510/471 |
| 2014/0206587 | A1 * | 7/2014 | Chen | C11D 3/225 510/130 |
| 2014/0213499 | A1 * | 7/2014 | Chen | C11D 17/0039 510/320 |
| 2015/0132327 | A1 * | 5/2015 | Okano | A61K 31/497 514/252.04 |
| 2015/0140048 | A1 * | 5/2015 | Klug | A61Q 19/007 514/629 |
| 2016/0177241 | A1 * | 6/2016 | Brundel | C11D 17/0039 512/4 |
| 2016/0346294 | A1 * | 12/2016 | Sengupta | A61P 17/00 |
| 2016/0355766 | A1 * | 12/2016 | Brooker | C11D 3/2068 |
| 2017/0007508 | A1 * | 1/2017 | Ferguson | A61K 8/64 |
| 2017/0198237 | A1 * | 7/2017 | Shearouse | C11D 1/83 |
| 2021/0198597 | A1 * | 7/2021 | Boardman | C11D 3/373 |
| 2022/0025298 | A1 * | 1/2022 | Carus | C11D 3/30 |

FOREIGN PATENT DOCUMENTS

| | | | | |
|---|---|---|---|---|
| CA | 3106040 | A1 * | 1/2020 | A61K 8/345 |
| CN | 1292025 | A | 4/2001 | |
| CN | 102439219 | A | 5/2012 | |
| CN | 102803456 | A | 11/2012 | |
| CN | 102834498 | A | 12/2012 | |
| EP | 1639067 | | 3/2006 | |
| EP | 2553069 | | 2/2013 | |
| EP | 2553069 | B1 * | 11/2017 | C11D 1/62 |
| EP | 3234086 | B1 * | 9/2018 | C11D 1/62 |
| IN | 288530 | | 10/2017 | |
| IN | 292260 | | 2/2018 | |
| WO | 9945089 | A1 | 9/1999 | |
| WO | 2006005480 | A1 | 1/2006 | |
| WO | WO-2010079100 | A1 * | 7/2010 | C11D 1/62 |
| WO | WO-2020014659 | A1 * | 1/2020 | A61K 8/345 |

OTHER PUBLICATIONS

The use of antioxidants in the preservation of edible oils. Liuping Fan, N.A. Michael Eskin, in Handbook of Antioxidants for Food Preservation, 2015. https://www.researchgate.net/figure/Fatty-acid-composition-of-cottonseed-oil-a_tbl2_277587385 (Year: 2015).*

Mannekote et al. Renewable and Sustainable Energy Reviews 81 (2018) 1787-1801 (Year: 2018).*

Omari et al. Green and Sustainable Chemistry > vol. 5 No. 4, Nov. 2015 (Year: 2015).*

Search Report and Written Opinion in PCTEP2019083753; Feb. 6, 2020.

Written Opinion in PCTEP2019083753; Nov. 5, 2020.

(Continued)

*Primary Examiner* — Mark Eashoo
*Assistant Examiner* — M. Reza Asdjodi
(74) *Attorney, Agent, or Firm* — Carter, DeLuca & Farrell, LLP; George Likourezos; Bret P. Shapiro

(57) ABSTRACT

A fabric conditioner composition comprising: 2 to 40 w.t. % fabric softening active; 0.25 to 3 w.t. % triglyceride; and water; wherein the triglyceride comprises at least 60% C18 chains.

10 Claims, No Drawings

(56) References Cited

OTHER PUBLICATIONS

European Patent Office Search Report and Written Opinion in corresponding European Patent Application No. EP18211783 dated Jun. 11, 2019 (7 pages).
IPRP2 in PCTEP2019083753; Apr. 7, 2021.
Ulmann's Encyclopedia of Industrial Chemistry, vol. 14, 2012, pp. 73 and 83, 2012.
Notice of Opposition issued in European Patent Application No. EP19812818 dated Nov. 15, 2023.

* cited by examiner

FABRIC CONDITIONER COMPOSITIONS

FIELD OF THE INVENTION

The present invention is in the field of stable fabric conditioner formulations.

BACKGROUND OF THE INVENTION

Fabric conditioners require a long shelf life, i.e. they must remain stable for a long period of time after manufacture. The product life cycle of a fabric conditioner includes manufacture, shipping, storage, display in a shop and storage in the consumers home, all before the product is used by the consumer. Each stage may represent a significant period of time, which when combined, results in a challenge for formulators to produce a product with a suitably long shelf life.

The requirement for a long shelf life is compounded by high temperatures. Products may experience temperatures in excess of 40° C. in some countries. High temperatures are known to reduce the shelf life of products. Therefore, in some countries enhanced storage stability is required.

There is a need for fabric conditioners with enhanced shelf life, particularly at high temperatures.

SUMMARY OF THE INVENTION

A first aspect of the present invention is a fabric conditioner composition comprising:

a. 1 to 50 w.t. % fabric softening active;

b. 0.125 to 3 w.t. % triglyceride; and c. Water;

wherein the triglyceride comprises at least 60% C18 chains.

A second aspect of the present invention is a method of making a fabric conditioner as described herein, wherein the triglyceride is added with or after the fabric softening active.

A third aspect of the present invention is a use of a triglyceride comprising at least 60% C18 chains to improve the shelf life of a fabric conditioner composition as described herein.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

Fabric Softening Actives

The composition of the present invention is a fabric conditioner or fabric softener. Fabric conditioners comprise active materials which soften or condition fabric. These are fabric softening compounds. The fabric softening compounds (also referred to herein as a fabric softening or conditioning actives or agents) may be any material known to soften fabrics. These may be polymeric materials or compounds known to soften materials.

Examples of suitable fabric softening actives include: quaternary ammonium compounds, silicone polymers, polysaccharides, clays, amines, fatty esters, dispersible polyolefins, polymer latexes and mixtures thereof.

The fabric softening compounds may preferably be cationic or non-ionic. Preferably, the fabric softening compounds of the present invention are cationic. Suitable cationic fabric softening compounds are described below.

Fabric conditioning compositions for use in accordance with the invention may be dilute or concentrated. Dilute products typically contain up to about 6%, generally about 1 to 5% by weight of softening compounds, whereas concentrated products may contain up to about 50 wt %, preferably from about 5 to about 50%, more preferably from 6 to 25% by weight active. Overall, the products of the invention may contain from 1 to 50 wt %, preferably from 2 to 25 wt % of softening compounds, more preferably 2 to 20 wt % of softening compounds.

The preferred softening compounds for use in fabric conditioner compositions of the invention are quaternary ammonium compounds (QAC).

The QAC preferably comprises at least one chain derived from fatty acids, more preferably at least two chains derived from fatty acids. Generally fatty acids are defined as aliphatic monocarboxylic acids having a chain of 4 to 28 carbons. Preferably the fatty acid chains are palm or tallow fatty acids. Preferably the fatty acid chains of the QAC comprise from 10 to 50 wt % of saturated C18 chains and from 5 to 40 wt % of monounsaturated C18 chains by weight of total fatty acid chains. In a further preferred embodiment, the fatty acid chains of the QAC comprise from 20 to 40 wt %, preferably from 25 to 35 wt % of saturated C18 chains and from 10 to 35 wt %, preferably from 15 to 30 wt % of monounsaturated C18 chains, by weight of total fatty acid chains.

The preferred quaternary ammonium fabric softening compounds for use in compositions of the present invention are so called "ester quats". Particularly preferred materials are the ester-linked triethanolamine (TEA) quaternary ammonium compounds comprising a mixture of mono-, di- and tri-ester linked components.

Typically, TEA-based fabric softening compounds comprise a mixture of mono, di- and tri ester forms of the compound where the di-ester linked component comprises no more than 70 wt % of the fabric softening compound, preferably no more than 60 wt % e.g. no more than 55%, or even no more that 45% of the fabric softening compound and at least 10 wt % of the monoester linked component.

A first group of quaternary ammonium compounds (QACs) suitable for use in the present invention is represented by formula (I):

(I)

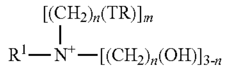

wherein each R is independently selected from a C5 to C35 alkyl or alkenyl group; R1 represents a C1 to C4 alkyl, C2 to C4 alkenyl or a C1 to C4 hydroxyalkyl group; T may be either O—CO. (i.e. an ester group bound to R via its carbon atom), or may alternatively be CO—O (i.e. an ester group bound to R via its oxygen atom); n is a number selected from 1 to 4; m is a number selected from 1, 2, or 3; and X— is an anionic counter-ion, such as a halide or alkyl sulphate, e.g. chloride or methylsulfate. Di-esters variants of formula I (i.e. m=2) are preferred and typically have mono- and tri-ester analogues associated with them. Such materials are particularly suitable for use in the present invention.

Suitable actives include soft quaternary ammonium actives such as Stepantex VT90, Rewoquat WE18 (ex-Evonik) and Tetranyl L1/90N, Tetranyl L190 SP and Tetranyl L190 S (all ex-Kao).

Also suitable are actives rich in the di-esters of triethanolammonium methylsulfate, otherwise referred to as "TEA ester quats".

Commercial examples include Preapagen™ TQL (ex-Clariant), and Tetranyl™ AHT-1 (ex-Kao), (both di-[hardened tallow ester] of triethanolammonium methylsulfate), AT-1 (di-[tallow ester] of triethanolammonium methylsulfate), and L5/90 (di-[palm ester] of triethanolammonium methylsulfate), (both ex-Kao), and Rewoquat™ WE15 (a di-ester of triethanolammonium methylsulfate having fatty acyl residues deriving from C10-C20 and C16-C18 unsaturated fatty acids) (ex-Evonik).

A second group of QACs suitable for use in the invention is represented by formula (II):

(II)

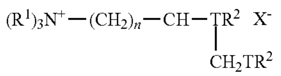

wherein each R1 group is independently selected from C1 to C4 alkyl, hydroxyalkyl or C2 to C4 alkenyl groups; and wherein each R2 group is independently selected from C8 to C28 alkyl or alkenyl groups; and wherein n, T, and X— are as defined above.

Preferred materials of this second group include 1,2 bis[tallowoyloxy]-3-trimethylammonium propane chloride, 1,2 bis[hardened tallowoyloxy]-3-trimethylammonium propane chloride, 1,2-bis[oleoyloxy]-3-trimethylammonium propane chloride, and 1,2 bis[stearoyloxy]-3-trimethylammonium propane chloride. Such materials are described in U.S. Pat. No. 4,137,180 (Lever Brothers). Preferably, these materials also comprise an amount of the corresponding mono-ester.

A third group of QACs suitable for use in the invention is represented by formula (III):

$(R^1)_2—N^+—[(CH_2)_n\text{-T-}R^2]_2X^-$(III)

wherein each R1 group is independently selected from C1 to C4 alkyl, or C2 to C4 alkenyl groups; and wherein each R2 group is independently selected from C8 to C28 alkyl or alkenyl groups; and n, T, and X— are as defined above. Preferred materials of this third group include bis(2-tallowoyloxyethyl)dimethyl ammonium chloride, partially hardened and hardened versions thereof.

A particular example of the fourth group of QACs is represented the by the formula:

(IV)

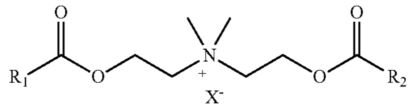

A forth group of QACs suitable for use in the invention are represented by formula (V)

(V)

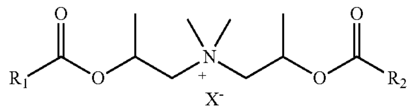

R1 and R2 are independently selected from 010 to C22 alkyl or alkenyl groups, preferably C14 to C20 alkyl or alkenyl groups. X— is as defined above.

The iodine value of the quaternary ammonium fabric conditioning material is preferably from 0 to 80, more preferably from 0 to 60, and most preferably from 0 to 45. The iodine value may be chosen as appropriate. Essentially saturated material having an iodine value of from 0 to 5, preferably from 0 to 1 may be used in the compositions of the invention. Such materials are known as "hardened" quaternary ammonium compounds.

A further preferred range of iodine values is from 20 to 60, preferably 25 to 50, more preferably from 30 to 45. A material of this type is a "soft" triethanolamine quaternary ammonium compound, preferably triethanolamine di-alkylester methylsulfate. Such ester-linked triethanolamine quaternary ammonium compounds comprise unsaturated fatty chains.

If there is a mixture of quaternary ammonium materials present in the composition, the iodine value, referred to above, represents the mean iodine value of the parent fatty acyl compounds or fatty acids of all of the quaternary ammonium materials present. Likewise, if there is any saturated quaternary ammonium materials present in the composition, the iodine value represents the mean iodine value of the parent acyl compounds of fatty acids of all of the quaternary ammonium materials present.

Iodine value as used in the context of the present invention refers to, the fatty acid used to produce the QAC, the measurement of the degree of unsaturation present in a material by a method of nmr spectroscopy as described in Anal. Chem., 34, 1136 (1962) Johnson and Shoolery.

A further type of softening compound may be a non-ester quaternary ammonium material represented by formula (VI):

(VI)

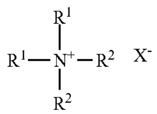

wherein each R1 group is independently selected from C1 to C4 alkyl, hydroxyalkyl or C2 to C4 alkenyl groups; R2 group is independently selected from C8 to C28 alkyl or alkenyl groups, and X— is as defined above.

Triglycerides

The present invention comprises triglycerides. A triglyceride is an ester derived from glycerol and three fatty acids. Accordingly, a triglyceride comprises three fatty chains which have the same structure as the fatty acids from which they are formed. For example, a triglyceride formed from three C18 saturated fatty acids, will comprise three C18 saturated fatty chains. Triglycerides may be naturally occurring or synthetic.

Triglycerides according to the present invention may contain a mixture of fatty chains. For example, castor oil comprises a mixture of palmitic, palmitoleic, steric, oleic, ricinoleic and linoleic fatty acid chains. ~87.5% of the chains in castor oil (calculated based on number of carbon chains) are C18 chains (steric, oleic, ricinoleic and linoleic acid). The fatty chain distribution of various natural oils is provided herein in the Examples section.

In the present invention, at least 60% of the fatty chains of the triglyceride are C18 chains. By at least 60% is meant 60 to 100% of the fatty chains are C18. Preferably, at least 70% of the fatty chains are C18 (i.e. 70% to 100%), more preferably at least 80% of the fatty chains are C18 (i.e. 80% to 100%), most preferably 85% of the fatty chains are C18 (i.e. 85% to 100%). Triglycerides having this structure improve shelf life stability of fabric conditioners.

Preferably the fabric conditioner compositions of the present invention comprise at least 50% unsaturated carbon chains (i.e. 50% to 100%). More preferably, at least 80% of the fatty chains are unsaturated carbon chains (i.e. 80% to 100%). Most preferably, at least 86% of the fatty chains are unsaturated carbon chains (i.e. 86% to 100%).

Preferably the fabric conditioner compositions of the present invention comprise at least 50% C18 unsaturated carbon chains (i.e. 50% to 100%). More preferably, at least 70% of the fatty chains are C18 unsaturated carbon chains (i.e. 70% to 100%). Most preferably, at least 86% of the fatty chains are C18 unsaturated carbon chains (i.e. 86% to 100%).

Preferably the triglyceride originates from a plant/vegetable source, i.e. plant derived. Plant sources tend to have lower polyunsaturated carbon chains compared to animal sources.

Particularly preferred triglycerides can be selected from: Olive oil, Cottonseed oil, Linseed oil, Castor oil, Safflower oil, Rapeseed oil and combinations thereof. Most preferably the triglyceride is castor oil.

The compositions of the present invention comprise more than 0.125 w.t. % triglyceride, more preferably, 0.25 w.t. % and most preferably 1 w.t.%. The compositions of the present invention comprise less than 3 w.t. % triglyceride, preferably less than 2.5 w.t.% triglyceride and most preferably less than 2% triglyceride. For example, the compositions comprise 0.125 to 3 w.t. % triglyceride, preferably 0.25 1o 2.5 w.t.% triglyceride and most preferably 0.5 to 2 w.t. % triglyceride.

Perfume

The fabric conditioners of the present invention preferable comprise perfume. Preferably the compositions comprises 0.1 to 30 w.t. % perfume materials, i.e. free perfume and/or perfume microcapsules. As is known in the art, free perfumes and perfume microcapsules provide the consumer with perfume hits at different points during the wash cycle. It is particularly preferred that the fabric conditioner of the present invention comprise a combination of both free perfume and perfume microcapsules.

Preferably the fabric conditioners of the present invention comprises 0.5 to 20 w.t.% perfume materials, more preferably 1 to 15 w.t.% perfume materials, most preferably 2 to 10 w.t. % perfume materials.

Useful perfume components may include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavouring, and/or aromatizing consumer products.

Free Perfumes:

The fabric conditioners of the present invention preferably comprises 0.1 to 15 w.t.% free perfume, more preferably 0.5 to 8 w.t. % free perfume.

Particularly preferred perfume components are blooming perfume components and substantive perfume components. Blooming perfume components are defined by a boiling point less than 250° C. and a Log P or greater than 2.5. Substantive perfume components are defined by a boiling point greater than 250° C. and a Log P greater than 2.5. Boiling point is measured at standard pressure (760 mm Hg). Preferably a perfume composition will comprise a mixture of blooming and substantive perfume components. The perfume composition may comprise other perfume components.

It is commonplace for a plurality of perfume components to be present in a free oil perfume composition. In the compositions for use in the present invention it is envisaged that there will be three or more, preferably four or more, more preferably five or more, most preferably six or more different perfume components. An upper limit of 300 perfume components may be applied.

Perfume Microcapsules:

The fabric conditioners of the present invention preferably comprises 0.1 to 15 w.t.% perfume microcapsules, more preferably 0.5 to 8 w.t. % perfume microcapsules. The weight of microcapsules is of the material as supplied.

When perfume components are encapsulated, suitable encapsulating materials, may comprise, but are not limited to; aminoplasts, proteins, polyurethanes, polyacrylates, polymethacrylates, polysaccharides, polyamides, polyolefins, gums, silicones, lipids, modified cellulose, polyphosphate, polystyrene, polyesters or combinations thereof. Particularly preferred materials are aminoplast microcapsules, such as melamine formaldehyde or urea formaldehyde microcapsules.

Perfume microcapsules of the present invention can be friable microcapsules and/or moisture activated microcapsules. By friable, it is meant that the perfume microcapsule will rupture when a force is exerted. By moisture activated, it is meant that the perfume is released in the presence of water. The fabric conditioners of the present invention preferably comprises friable microcapsules. Moisture activated microcapsules may additionally be present. Examples of a microcapsules which can be friable include aminoplast microcapsules.

Perfume components contained in a microcapsule may comprise odiferous materials and/or pro-fragrance materials.

Particularly preferred perfume components contained in a microcapsule are blooming perfume components and substantive perfume components. Blooming perfume components are defined by a boiling point less than 250° C. and a Log P greater than 2.5. Substantive perfume components are defined by a boiling point greater than 250° C. and a Log P greater than 2.5. Boiling point is measured at standard pressure (760 mm Hg). Preferably a perfume composition will comprise a mixture of blooming and substantive perfume components. The perfume composition may comprise other perfume components.

It is commonplace for a plurality of perfume components to be present in a microcapsule. In the compositions for use in the present invention it is envisaged that there will be three or more, preferably four or more, more preferably five or more, most preferably six or more different perfume components in a microcapsule. An upper limit of 300 perfume components may be applied.

The microcapsules may comprise perfume components and a carrier for the perfume ingredients, such as zeolites or cyclodextrins.

Other Ingredients

Nonionic Surfactant:

The compositions may further comprise a nonionic surfactant. Typically these can be included for the purpose of stabilising the compositions. Suitable nonionic surfactants include addition products of ethylene oxide and/or propylene oxide with fatty alcohols, fatty acids and fatty amines. Any of the alkoxylated materials of the particular type described hereinafter can be used as the nonionic surfactant.

Suitable surfactants are substantially water soluble surfactants of the general formula (VII):

$$R—Y—(C2H4O)z\text{-}CH2\text{-}CH2\text{-}OH \quad (VII)$$

where R is selected from the group consisting of primary, secondary and branched chain alkyl and/or acyl hydrocarbyl groups; primary, secondary and branched chain alkenyl hydrocarbyl groups; and primary, secondary and branched chain alkenyl-substituted phenolic hydrocarbyl groups; the hydrocarbyl groups having a chain length of from 8 to about 25, preferably 10 to 20, e.g. 14 to 18 carbon atoms.

In the general formula for the ethoxylated nonionic surfactant, Y is typically:

—O—, —C(O)O—, —C(O)N(R)— or —C(O)N(R)
R— in which R has the meaning given above for formula (VII), or can be hydrogen; and Z is at least about 8, preferably at least about 10 or 11.

Preferably the nonionic surfactant has an HLB of from about 7 to about 20, more preferably from 10 to 18, e.g. 12 to 16. Genapol™ C200 (Clariant) based on coco chain and 20 EO groups is an example of a suitable nonionic surfactant.

If present, the nonionic surfactant is present in an amount from 0.01 to 10%, more preferably 0.1 to by weight, based on the total weight of the composition.

A class of preferred non-ionic surfactants include addition products of ethylene oxide and/or propylene oxide with fatty alcohols, fatty acids and fatty amines. These are preferably selected from addition products of (a) an alkoxide selected from ethylene oxide, propylene oxide and mixtures thereof with (b) a fatty material selected from fatty alcohols, fatty acids and fatty amines.

Suitable surfactants are substantially water-soluble surfactants of the general formula (VIII):

$$R—Y—(C2H4O)z\text{-}CH2\text{-}CH2\text{-}OH \quad (VIII)$$

where R is selected from the group consisting of primary, secondary and branched chain alkyl and/or acyl hydrocarbyl groups (when Y=—C(O)O, R≠an acyl hydrocarbyl group); primary, secondary and branched chain alkenyl hydrocarbyl groups; and primary, secondary and branched chain alkenyl-substituted phenolic hydrocarbyl groups; the hydrocarbyl groups having a chain length of from 10 to 60, preferably 10 to 25, e.g. 14 to 20 carbon atoms.

In the general formula for the ethoxylated nonionic surfactant, Y is typically:

—O—, —C(O)O—, —C(O)N(R)— or —C(O)N(R)
R— in which R has the meaning given above for formula (VIII), or can be hydrogen; and Z is at least about 6, preferably at least about 10 or 11.

Lutensol™ AT25 (BASF) based on C16:18 chain and 25 EO groups is an example of a suitable non-ionic surfactant. Other suitable surfactants include Renex 36 (Trideceth-6), ex Croda; Tergitol 15-S3, ex Dow Chemical Co.; Dihydrol LT7, ex Thai Ethoxylate ltd; Cremophor CO40, ex BASF and Neodol 91-8, ex Shell.

Co-Softeners:

Co-softeners may be used. When employed, they are typically present at from 0.1 to 20% and particularly at from 0.5 to 10%, based on the total weight of the composition. Preferred co-softeners include fatty esters, and fatty N-oxides. Fatty esters that may be employed include fatty monoesters, such as glycerol monostearate, fatty sugar esters, such as those disclosed WO 01/46361 (Unilever).

The compositions of the present invention may comprise a fatty complexing agent.

Especially suitable fatty complexing agents include fatty alcohols and fatty acids. Of these, fatty alcohols are most preferred.

Without being bound by theory it is believed that the fatty complexing material improves the viscosity profile of the composition by complexing with mono-ester component of the fabric conditioner material thereby providing a composition which has relatively higher levels of di-ester and tri-ester linked components. The di-ester and tri-ester linked components are more stable and do not affect initial viscosity as detrimentally as the mono-ester component.

It is also believed that the higher levels of mono-ester linked component present in compositions comprising quaternary ammonium materials based on TEA may destabilise the composition through depletion flocculation. By using the fatty complexing material to complex with the mono-ester linked component, depletion flocculation is significantly reduced.

In other words, the fatty complexing agent at the increased levels, as required by the present invention, "neutralises" the mono-ester linked component of the quaternary ammonium material. This in situ di-ester generation from mono-ester and fatty alcohol also improves the softening of the composition.

Preferred fatty acids include tallow fatty acid or vegetable fatty acids, particularly preferred are hardened tallow fatty acid or hardened vegetable fatty acid (available under the trade name Pristerene™, ex Croda). Preferred fatty alcohols include tallow alcohol or vegetable alcohol, particularly preferred are hardened tallow alcohol or hardened vegetable alcohol (available under the trade names Stenol™ and Hydrenol™, ex BASF and Laurex™ CS, ex Huntsman).

The fatty complexing agent is preferably present in an amount greater than 0.3 to 5% by weight based on the total weight of the composition. More preferably, the fatty component is present in an amount of from 0.4 to 4%. The weight ratio of the mono-ester component of the quaternary ammonium fabric softening material to the fatty complexing agent is preferably from 5:1 to 1:5, more preferably 4:1 to 1:4, most preferably 3:1 to 1:3, e.g. 2:1 to 1:2.

Further Ingredients:

The compositions may comprise other ingredients of fabric conditioner liquids as will be known to the person skilled in the art. Among such materials there may be mentioned: antifoams, insect repellents, shading or hueing dyes, preservatives (e.g. bactericides), pH buffering agents, perfume carriers, hydrotropes, anti-redeposition agents, soil-release agents, polyelectrolytes, anti-shrinking agents, anti-wrinkle agents, anti-oxidants, dyes, colorants, sunscreens, anti-corrosion agents, drape imparting agents, anti-static agents, sequestrants and ironing aids. The products of the invention may contain pearlisers and/or opacifiers. A preferred sequestrant is HEDP, an abbreviation for Etidronic acid or 1-hydroxyethane 1,1-diphosphonic acid.

Form of the Invention

The fabric conditioner composition is preferably in an aqueous form. The compositions preferably comprise at least 75 w.t.% water.

Method of Manufacture

The fabric conditioner formulations of the present invention may be made by any method known in the art.

Preferably the triglyceride is added with or after the fabric softening active, more preferably with the fabric softening active, i.e. at the same time as the fabric softening active. In a most preferred aspect of the present invention, the fabric softening active and triglyceride are combined or pre-mixed in a separate pre-melt prior to addition to the main fabric conditioner mix.

Preferably the triglyceride is added to the fabric conditioner mix before or with any perfume components, preferably before any perfume materials.

Use of the Compositions

In one aspect of the present invention a triglyceride comprising at least 60 w.t. % C18 chains is used to improve the shelf life of a fabric conditioner as described herein.

Preferably the triglyceride is used to improve the shelf life of a fabric conditioner composition as described herein, at temperatures over 37° C.

For example, the triglycerides as described herein may be used to maintain the viscosity of a fabric conditioner (as described herein), stored at 50° C., bellow 250 mPas at 106 s-1, for more than 50 days.

Viscosity was measured using an Anton Paar ASC instrument using cup and bob. Viscosity was measured at an equilibrated temperature of 25° C. at a shear rate of 106 s-1 reciprocal seconds. Data was collected for 60 seconds at a rate of 1 measurement per second and the average over the 60 seconds recorded as the viscosity.

Treatment of Clothes

In one aspect of the present invention, clothes are treated with a fabric conditioner composition. The treatment is preferably during the washing process. This may be hand washing or machine washing. Preferable the fabric conditioner is used in the rinse stage of the washing process.

Preferably the clothes are treated with a 10 to 100 ml dose of fabric conditioner for a 4 to 7 kg load of clothes. More preferably, 10 to 80 ml for a 4 to 7 kg load of clothes.

EXAMPLES

The effect of various triglycerides (oils) on shelf life was tested.

TABLE 1

Carbon Chain distributions of oils used in the present examples

| Carbon Chain Distributions (%): | | Palm oil | Cottonseed oil | Olive oil | Rapeseed Low Erucic | Safflower oil | Linseed oil | Castor oil | Fish oil |
|---|---|---|---|---|---|---|---|---|---|
| Myristic | C14 | 1.25 | 1.25 | 0.5 | 0.01 | | | | 7 |
| Myristoleic | C14:1 | | | | | | | | |
| Palmitic | C16 | 45.5 | 21.5 | 11.5 | 4.5 | 7 | 5.5 | 1.5 | 12.5 |
| Palmitoleic | C16:1 | 1.25 | 1 | | | | | | |
| Stearic | C18 | 5 | 2 | 2 | 2 | 3.5 | 3.5 | 1.5 | 2 |
| Oleic | C18:1 | 37.5 | 29 | 75 | 57.5 | 16.5 | 20 | 4.5 | 12 |
| Ricinoleic | C18:1.OH | | | | | | | 87.5 | |
| Linoleic | C18:2 | 9.5 | 48 | 9.5 | 23 | 72.5 | 15 | 4.5 | 7 |
| Linolenic | C18:3 | | | | 11 | 1.75 | 52.5 | | 2 |
| Arachidic | C20 | 0.5 | | | | | | | |
| Gadoleic | C20:1 | | | | 3 | | | | 17 |
| Mixed unsat C20 | average C20:3 | | | | | | | | 20 |
| Behenic | C22 | | | | 0.01 | | | | |
| Erucic | C22:1 | | | | 2.5 | | | | |
| Mixed unsat C22 | average C22:3 | | | | | | | | 17.5 |
| Lignoceric | C24 | | | | 0.01 | | | | |
| Totals: | | | | | | | | | |
| % C18 chains | | 52 | 79 | 86.5 | 93.5 | 94.25 | 91 | 98 | 23 |
| % unsaturated chains | | 48.25 | 78 | 84.5 | 97 | 90.75 | 87.5 | 96.5 | 75.5 |
| % C18 unsaturated chains | | 47 | 77 | 84.5 | 91.5 | 90.75 | 87.5 | 96.5 | 21 |

Fabric conditioner formulations according to the invention were prepared (Examples 1-6) along with a Control formulation and Comparative formulations (A and B).

TABLE 2

Test fabric conditioner formulations

| Ingredient | Active w.t. % in Composition |
|---|---|
| Quaternary ammonium (Di-[partially hardened tallow ester] of triethanolammonium methylsulphate) | 12 |
| Oil (when present) | 1 |

TABLE 2-continued

| Test fabric conditioner formulations | |
|---|---|
| Ingredient | Active w.t. % in Composition |
| Free perfume | 2.1 |
| Encapsulated | 0.3 |
| Cationic polymer* | 0.12 |
| Water and Minors | To 100 |

*Flosoft270LS exSNF

Control: No oil
Comparative A: Palm oil
Comparative B: Fish Oil
Example 1: Cottonseed oil
Example 2: Olive oil
Example 3: Rapeseed Low Erucic
Example 4: Safflower oil
Example 5: Linseed oil
Example 6: Castor oil Method of Preparation:

Water was heated in a vessel to −50° C., the cationic polymer was added with stirring, followed by the mirrors. A premix of quaternary ammonium and oil (when present) was prepared at −65° C. and added to the main mix vessel with stirring. The mix was then cooled to −35° C. and the perfume ingredients added.

Test Method:

Each test formulation was prepared as above and a sample of each formulation was stored at 50° C., 40° C., 37° C. and 28° C. The samples where regularly monitored and the number of days to 'fail' was recorded. 'Fail' is defined as thicken to over 250 mPas at 106 s-1.

Viscosity was measured using an Anton Paar ASC instrument using cup and bob. Viscosity was measured at an equilibrated temperature of 25° C. at a shear rate of 106 s-1 reciprocal seconds. Data was collected for 60 seconds at a rate of 1 measurement per second and the average over the 60 seconds recorded as the viscosity.

TABLE 3

| Results | | | | | |
|---|---|---|---|---|---|
| | Initial viscosity | Days to Fail: | | | |
| Formulation: | (106 s−1) | 50° C. | 40° C. | 37° C. | 28° C. |
| Control A* | 60 | 48 | 102 | 133 | 477 |
| Comparative A: Palm oil | 80 | 43 | 103 | Not measured | Not measured |
| Comparative B: Fish Oil | 73 | 44 | 111 | Not measured | Not measured |
| Example 1: Cottonseed oil | 71 | 53 | 118 | 175 | >528 |
| Example 2: Olive oil | 69 | 55 | 123 | 178 | >528 |
| Example 3: Rapeseed Low Erucic | 70 | 57 | 126 | 181 | >528 |

TABLE 3-continued

| Results | | | | | |
|---|---|---|---|---|---|
| | Initial viscosity | Days to Fail: | | | |
| Formulation: | (106 s−1) | 50° C. | 40° C. | 37° C. | 28° C. |
| Example 4: Safflower oil | 75 | 57 | 123 | 180 | >528 |
| Example 5: Linseed oil | 67 | 61 | 129 | 182 | >528 |
| Example 6: Castor oil | 84 | 65 | 126 | 184 | >528 |

*The control results are an average of a number of samples.

The Example formulations demonstrated a longer shelf life than the Control and Comparative formulations.

The invention claimed is:

1. A fabric conditioner composition comprising:
a. 1 to 50 wt. % quaternary ammonium compound, the quaternary ammonium compound comprising at least one chain derived from fatty acids;
b. 0.125 to 3 wt. % triglyceride; and
c. water;
wherein the triglyceride comprises at least 60% C18 chains and at least 86 wt. % unsaturated carbon chains, improves a shelf life of the fabric conditioner composition at temperatures over 37° C., and maintains a viscosity of the fabric conditioner composition below 250 mPas at 106 s-1 for more than 50 days when stored at 50° C., and the quaternary ammonium compound is an ester quat.

2. The fabric conditioner according to claim 1, wherein the triglyceride comprises at least 50 wt. % unsaturated C18 carbon chains.

3. The fabric conditioner composition according to claim 1, wherein the triglyceride originates from a vegetable source.

4. The fabric conditioner composition according to claim 1, wherein the triglyceride is selected from: Olive oil, Cottonseed oil, Linseed oil, Castor oil, Safflower oil, Rapeseed oil and combinations thereof.

5. The fabric conditioner composition according to claim 1, wherein the fabric conditioning composition further comprises a perfume composition.

6. A method of making a fabric conditioner composition according to claim 1, wherein the triglyceride is added with or after the fabric softening active.

7. The method of making a fabric conditioner according to claim 6 wherein the fabric softening active and triglyceride are premixed prior to addition.

8. The method of making a fabric conditioner composition according to claim 6, wherein the triglyceride is added before or with perfume.

9. The method according to claim 6 wherein the triglyceride comprises at least 70 wt. % C18 chains.

10. The method according to claim 6, wherein the triglyceride is used to improve the shelf life of the fabric conditioner composition.

* * * * *